United States Patent [19]

Hahn et al.

[11] 4,008,631
[45] Feb. 22, 1977

[54] MACHINE TOOL

[75] Inventors: Robert S. Hahn, Northboro; Bruno A. Holmstrom, West Boylston; Arthur F. St. Andre, Marlboro; David H. Youden, Shrewsbury, all of Mass.

[73] Assignee: Cincinnati Milacron-Heald Corporation, Worcester, Mass.

[22] Filed: Nov. 6, 1975

[21] Appl. No.: 629,598

Related U.S. Application Data

[60] Division of Ser. No. 544,266, Jan. 27, 1975, which is a continuation of Ser. No. 393,738, Sept. 4, 1973, which is a continuation of Ser. No. 184,162, Sept. 27, 1971, abandoned.

[52] U.S. Cl. .............................. 82/1 C; 90/24 R; 83/170; 29/106
[51] Int. Cl.² .................... B23D 1/00; B23B 3/00; B26D 1/00
[58] Field of Search .................. 82/1 C, 1; 90/24 R, 90/24 A, 24 B, 24 C, 24 D, 24 E, 24 F; 83/170, 171; 29/106

[56] References Cited

UNITED STATES PATENTS

| | | | |
|---|---|---|---|
| 2,358,772 | 9/1944 | Brow et al. | 29/106 |
| 2,600,453 | 6/1952 | Weingart | 82/1 C |
| 2,848,790 | 8/1958 | McMann | 29/106 |
| 3,787,720 | 1/1974 | Zavoday, Jr. | 90/24 R |

*Primary Examiner*—Harrison L. Hinson
*Attorney, Agent, or Firm*—Norman S. Blodgett; Gerry A. Blodgett

[57] ABSTRACT

A machine tool including a hard brittle tool having a cutting edge and a means for heating the tool adjacent the cutting edge.

1 Claim, 2 Drawing Figures

MACHINE TOOL

This is a division of application Ser. No. 544,266 filed Jan. 27, 1975 which is a continuation of application Ser. No. 393,738 filed Sept. 4, 1973 which in turn is a continuation of patent application Ser. No. 184,162 filed Sept. 27, 1971, now abandoned.

BACKGROUND OF THE INVENTION

In machining operations, considerable success has been experienced in the recent past by use of the so-called "high-temperature" materials. Such materials (which include ceramics and carbides) are very hard and permit high metal removal rates, particularly in cutting operations. However, in addition to being hard, these materials are also brittle, and it has been found that the life of tools formed from such materials is shortened by the appearance of cracks on the surface, which cracks enlarge and, eventually, lead to total destruction by breakage of the tool. When one attempts to avoid such cracking breakage of the tool. When one attempts to avoid such cracking by operating at a lower metal removal rate, the advantages of using such materials in the first place disappear, since other materials which are not subject to cracking can be used at such lower metal removal rates. Furthermore, there are many materials which (like the tool) have high-temperature characteristics and which can be machined only by ceramic and carbide tools. In machining such metals, the cracking appears even at lower rates. These and other difficulties experienced with the prior art devices have been obviated in a novel manner by the present invention.

It is, therefore, an outstanding object of the invention to provide a machine tool which can operate at high metal removal rates and still enjoy a long life of service.

Another object of this invention is the provision of a machine tool including means for preventing cracking in a high-temperature tool.

A further object of the present invention is the provision of a machine tool having means for prolonging the life of a ceramic or carbide tool.

It is another object of the instant invention to provide a machine tool having means for maintaining a high-temperature tool at a constant temperature despite changes of stress in the tool.

A still further object of the invention is the provision of a machine tool having a long life despite respected changes in metal removal rates.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a tool holder and a tool having a cutting edge. A fastener is provided for holding the tool on the tool holder and means is provided for heating the tool adjacent the cutting edge.

More specifically, the tool is formed af a high-temperature material, such as ceramic, and the heating means is a gas burner receiving combustible fuel through a passage in the tool holder.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
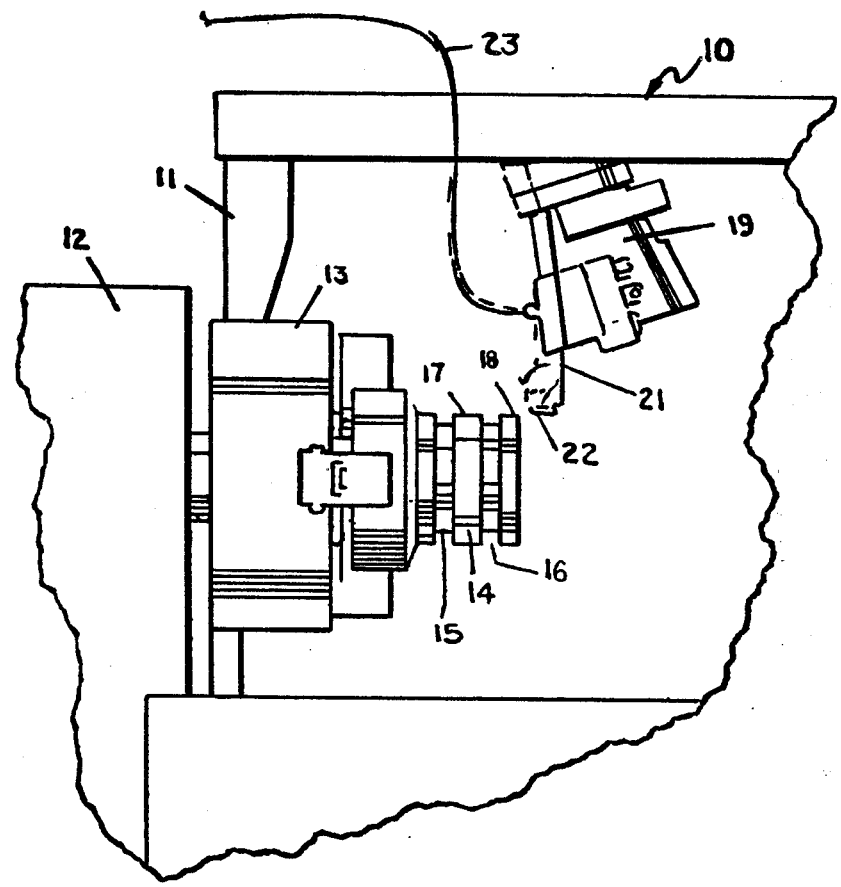
FIG. 1 is a front elevational view of a machine tool incorporating the principles of the present invention.

Referring first to FIG. 1, wherein are best shown the general features of the invention, the machine tool, indicated generally by the reference numeral 10, is shown as having a base 11 on which is mounted a workhead 12. Rotatably mounted on the workhead 12 is a chuck 13 carrying a workpiece 14 from which metal is to be removed. For the purpose of illustration, the workpiece 14 is shown as having two grooves 15 and 16 defining two generally cylindrical portions 17 and 18 from which a layer of metal is to be removed. As such, the workpiece 14 represents a typical workpiece having an "interrupted cut".

Extending from a portion of the base 11 of the machine tool is a rotatable turret 19 on which is mounted a tool holder 21. The tool holder carries a tool 22 at one end extending toward the workpiece 14. A conduit 23 extends from the other ends of the toolholder and is connected to a source of combustible fuel (not shown).

Figure 2:
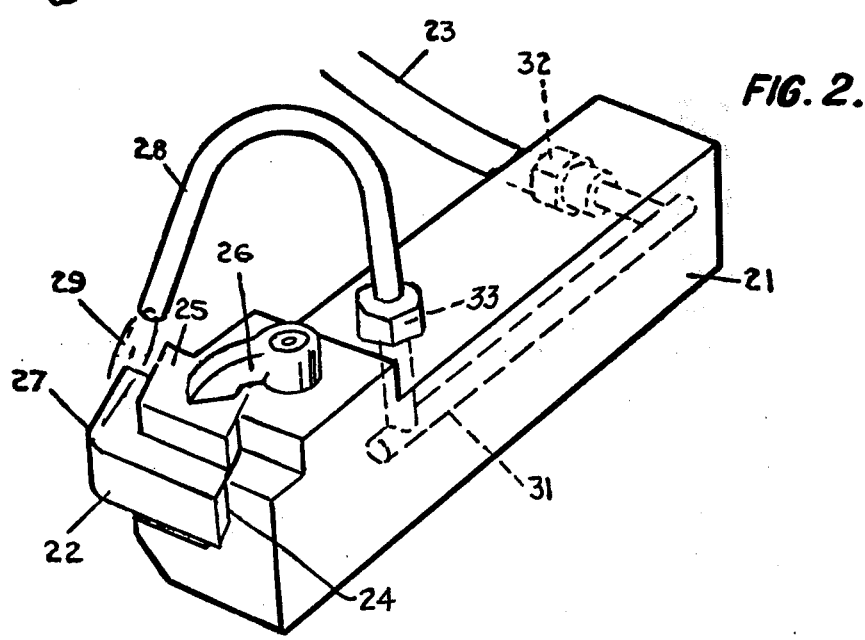
FIG. 2 is a perspective view of a portion of the machine tool.

Referring now to FIG. 2, it can be seen that the tool holder 21 is provided at one end with a notch 24 in which the tool 22 rests. A block 25 rests on the upper surface of the tool 22 and assists a clamp or fastening 26 in holding the tool in place. The tool 22 is of a generally square configuration with at least one rounded corner having a cutting edge 27. Extending from the tool holder 21 and having its nozzle opening directed toward the tool 22 adjacent the edge 23 is a burner 28 capable of maintaining a flame 29 directed toward the tool. A passage 31 at one end is connected by a fitting 32 to the conduit 23 to receive the combustible fuel which may be gas, such as propane, from a pressure tank (not shown) and, at the other end, by a fitting 33 to the burner 28.

The operation of the apparatus will now be readily understood in view of the above description. The machine tool is set in operation so that the workhead 12 rotates the chuck 13 and the workpiece 14 about the axis of the surface to be generated by the tool 22. The tool holder 21 is brought into position by the turret 19, so that the tool 22 is in position to perform the machining operation of the workpiece. In the particular operation shown, the tool 22 is brought into position so that the cutting edge 27 is located so that, when the workpiece is advanced axially, the cutting edge will generate a helical cut over the portions 18 and 17 of the workpiece in the well-known manner. Presumably, longitudinal and transverse motion takes place because of suitable equipment, not shown, provided between the base 11 and the workhead 12. When this operation is performed, it will be noted that the tool 22 will, first of all, reside in the air in front of the free end of the workpiece, will then engage the leading edge of the cylindrical portion 18, will then perform a machining operation on that portion, will then enter the air in the groove 16, will then advance across the groove and engage the leading edge of the portion 17, will then perform a machining operation on the portion 17, and will then leave that portion to enter the air in the groove 15. In this process, it can be seen that the tool will be subjected to cold air in at least three parts of the cycle and to high-temperature stress in at least two other parts of the cycle. In other words, it will be subjected to a temperature variation of cool, hot, cool, hot, and cool. Studies have shown that the life of a ceramic tool similar to the tool 22 is considerably shortened by this variation in temperature. Such temperature variations, when repeated a sufficient number of times, cause small cracks to appear on the surface of the tool and, ultimately, these cracks increase in size to the point where the tool breaks.

By use of the present invention, it is possible to maintain the tool 22 continually at a temperature in the area of the temperature to which it is raised during the highest stress of machining. When the tool enters an area of lower stress (such as exists before it reaches the leading edge of the portion 18 of the workpiece 14 while it is in the groove 16, or while it is in the groove 15) it is, nevertheless, maintained at a high-temperature consistent with the high stress. Therefore, the tool is not subjected to continuous cooling and heating. The cracks, therefore, do not appear and the tool life is greatly extended. In an experimental version of the present invention (set up exactly as shown in FIG. 1 and FIG. 2), the life of the tool was at least doubled and, sometimes, quadrupled over the period of life experienced without the use of the present invention. It can be seen that the use of this apparatus is indicated where brittle tools are used with variations in cutting stress and attendant variations in induced sub-surface thermal stress. Such situations can be found where there is a non-uniform stock distribution from workpiece-to-workpiece or where there is a stock variation within a given workpiece. It also applies in the case of workpieces with interruptions, such as has been described above in connections with workpiece 14 and, of course, when entering and leaving the work area. It is particularly applicable where machining is being done on very hard materials, such as those that have been heat treated and where the cutting machining operation is to be performed instead of grinding. While, theoretically, the temperature of the tool will vary slightly between the situation that occurs when the tool is in the air and the situation when it is doing a heavy machining operation, nevertheless, the use of the flame 29 assures that the variations in temperature are slight. This causes a reduction in the thermally-induced sub-surface stresses. The variations are far below the type of variations that bring about cracking of the tool surface.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A process for removing material from a workpiece, comprising the steps of:
   a. applying to the workpiece a ceramic tool having a cutting edge,
   b. advancing the cutting edge of the tool relative to the workpiece to remove the material,
   c. directing a gas flame to the cutting edge of the tool, thus providing hot gas to the said cutting edge for direct heating of the tool with only indirect heating of the workpiece, and
   d. maintaining the tool in a range of high temperatures for a period of time, said range of temperatures being independent of whether the tool is cutting or idling during the period, so that the tool does not develop cracks due to wide variations in temperature.

* * * * *